(12) United States Patent
Kobori et al.

(10) Patent No.: US 10,191,241 B2
(45) Date of Patent: Jan. 29, 2019

(54) IMAGING DEVICE (71) Applicant: FUJIFILM Corporation, Tokyo (JP)

(72) Inventors: Makoto Kobori, Saitama (JP); Yoshiaki Ishii, Saitama (JP); Naoki Sasaki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 472 days.

(21) Appl. No.: 14/877,533

(22) Filed: Oct. 7, 2015

(65) Prior Publication Data
US 2016/0097912 A1 Apr. 7, 2016

Related U.S. Application Data (63) Continuation of application No. PCT/JP2014/058293, filed on Mar. 25, 2014.

(30) Foreign Application Priority Data

Apr. 9, 2013 (JP) ................................. 2013-081645

(51) Int. Cl.
G02B 7/02 (2006.01)
H04N 5/225 (2006.01)
(52) U.S. Cl.
CPC ............. *G02B 7/028* (2013.01); *G02B 7/025* (2013.01); *H04N 5/2254* (2013.01)
(58) Field of Classification Search
CPC .... G02B 3/0075; G02B 6/4267; G02B 7/028; G02B 7/008; G02B 7/023; G02B 7/02;
(Continued)

(56) References Cited

U.S. PATENT DOCUMENTS

2007/0146908 A1* 6/2007 Li .................... G02B 7/028
359/820
2009/0147229 A1* 6/2009 Schaffer ............ G02B 7/026
355/67
(Continued)

FOREIGN PATENT DOCUMENTS

| JP | 2004-147188 A | 5/2004 |
| JP | 2008-211780 A | 9/2008 |
| JP | 2008-304641 A | 12/2008 |

OTHER PUBLICATIONS

International Search Report, issued in PCT/JP2014/058293, dated Jul. 1, 2014.
(Continued)

*Primary Examiner* — Mahidere S Sahle
(74) *Attorney, Agent, or Firm* — Birch, Stewart, Kolasch and Birch, LLP (57) ABSTRACT

The present invention provides an imaging device in which focus movement due to a temperature variation is suppressed and the infiltration of foreign matter such as liquid or dust is prevented. An imaging device 10 is provided with an imaging lens 11, an imaging element 12, and an intermediate member 15. The imaging lens 11 is held by a lens-barrel 13 and forms an image of a photographic subject. The imaging element 12 captures the image of the photographic subject which is formed by the imaging lens 11. The intermediate member 15 has, on the inner-peripheral-surface of one end thereof, a flange portion 15a which comes into contact with the lens-barrel 13, and holds the lens-barrel 13 by joining the front surface 26 of a flange portion 13b of the lens-barrel 13 and the surface 27 on the imaging element 12 side of the flange portion 15a to each other.

18 Claims, 9 Drawing Sheets (58) Field of Classification Search
CPC ....... G02B 7/181; G02B 7/00; G03F 7/70891; G03F 7/7095
USPC .................................................. 359/811–830
See application file for complete search history.

(56) References Cited

U.S. PATENT DOCUMENTS

| 2010/0165492 A1* | 7/2010 | Kimura | G02B 7/021 |
| | | | 359/820 |
| 2014/0204476 A1* | 7/2014 | Takase | G02B 7/021 |
| | | | 359/738 |

OTHER PUBLICATIONS

Written Opinion of the International Searching Authority, issued in PCT/JP2014/058293, dated Jul. 1, 2014.

* cited by examiner

IMAGING DEVICE

CROSS-REFERENCE TO RELATED APPLICATIONS

This application is a Continuation of PCT International Application No. PCT/JP2014/058293 filed on Mar. 25, 2014, which claims priority under 35 U.S.C § 119(a) to Japanese Patent Application No. 2013-081645 filed on Apr. 9, 2013. Each of the above application(s) is hereby expressly incorporated by reference, in its entirety, into the present application.

BACKGROUND OF THE INVENTION

1. Field of the Invention

The present invention relates to an imaging device which captures an image of a photographic subject which is formed by an imaging optical system such as a lens, by an imaging element, and an imaging device which is used in an environment in which a temperature variation is large.

2. Description of the Related Art

An imaging device which captures an image of a photographic subject which is formed by an imaging optical system such as a lens, by an imaging element, has become popularized. The imaging device is used in equipment, the main function of which is photographing, such as a digital camera or a digital video camera, and in addition, an imaging device (a camera module) is also additionally mounted in a mobile phone, a smart phone, a PDA, a notebook type personal computer, or the like according to the downsizing of the imaging device. In addition, the imaging device is also in widespread use as a monitoring camera which is installed outdoors, or a car-mounted camera which is mounted on a moving body (for example, an automobile, a motorcycle, a bicycle, a ship, or an aircraft) for travel recording, support of parking in a garage, or the like.

Although the imaging devices are used in various locations in this manner, in particular, in an imaging device which is used in a harsh environment in which a temperature variation is large, such as the car-mounted camera, it is required to exhibit stable performance regardless of the expansion or the contraction of each portion configuring the imaging device. For example, in a case where an imaging device which does not have a focus adjustment function is assembled such that a focal position is fixed in a normal-temperature environment (for example, an environment of about 20° C.), if the imaging device is used in a high-temperature environment (for example, an environment of about 80° C.), focus movement may occur due to the expansion of a lens or a lens barrel holding the lens, and therefore, it is preferable to compensate for the focus movement due to a temperature variation.

JP2004-147188A discloses a digital camera in which an expanding and contracting member which expands and contracts according to temperature is provided on the rear surface of an imaging element. In this digital camera, in a case where a temperature variation occurs, the position of the imaging element is automatically finely adjusted by the expansion and the contraction of the expanding and contracting member, thereby compensating for focus movement.

JP2008-304641A discloses a car-mounted camera for infrared photographing in which focus movement due to a temperature variation is suppressed by forming a lens barrel into a double structure composed of an outer cylinder and an inner cylinder. Specifically, the car-mounted camera of JP2008-304641A has a structure in which a base end of the outer cylinder is fixed to a support integrated with an imaging element and the tip of the outer cylinder is fixed to the tip of the inner cylinder, and is made such that a focal position is maintained on the imaging element even in a temperature variation by offsetting the shift of the focal position due to the expansion to the photographic subject side of the lens barrel (the expansion of the outer cylinder) on the basis of the support and a change in the refractive index of a lens due to the expansion from the tip of the outer cylinder to the imaging element side (the expansion of the inner cylinder) by adjusting the materials (the thermal expansion coefficients) and the lengths of the outer cylinder and the inner cylinder.

Further, JP2008-211780A discloses an imaging device in which a lens barrel has a double structure composed of a lens holding unit (an inner cylinder) and an intermediate member (an outer cylinder) and the mounting position of the lens holding unit with respect to the intermediate member can be changed to have three predetermined positions, and discloses a technique in which in a case where focus movement occurs due to a temperature variation, the focus movement due to a temperature variation is suppressed by changing the mounting position of the lens holding unit.

SUMMARY OF THE INVENTION

In an imaging device which is used in an environment in which a temperature variation is large, like a car-mounted camera or the like, focus movement due to a temperature variation has to be suppressed, as described above. However, there is a case where it is further required to prevent the infiltration of foreign matter such as liquid typified by water, or dust. This is because in many cases, an imaging device which is used in a harsh environment is exposed to liquid, dust, or the like as well as a temperature variation and thus if foreign matter such as liquid or dust infiltrates, there is a possibility that a photographed image may deteriorate due to dew condensation or dirt or a control circuit of an imaging element may be short-circuited and damaged.

For example, in the case of the car-mounted camera, not only in a case of being installed outside the interior of an automobile, but also in a case of being installed in the interior of an automobile, when interior cleaning is performed, there is a case where water or a washing liquid becomes stuck to and infiltrates into an imaging device. In particular, in a case of compensating for focus movement by forming a lens barrel into a double structure, there are more infiltration pathways for foreign matter such as liquid or dust than in a case where a lens barrel has a single structure, and therefore, it is required to more reliably prevent the infiltration of foreign mater such as liquid or dust.

In the imaging device disclosed in JP2004-147188A, a lens support portion which directly supports a lens is bonded to the inner surface of a cylindrical barrel base portion fixed to a driving substrate (a CCD plate) of the imaging element, and thus a lens barrel having a double structure composed of the barrel base portion and the lens support portion as a whole is provided. However, the barrel base portion or the lens support portion repeatedly expand and contract due to a temperature variation, and thus an adhesive deteriorates, whereby there is a case where the infiltration of foreign matter such as liquid or dust becomes easy.

Further, in the imaging device disclosed in JP2008-304641A, the inner cylinder and the outer cylinder of the lens barrel are screwed to each other. However, if these cylinders repeatedly expand and contract due to a temperature variation, there is a possibility that foreign matter such as liquid or dust may infiltrate from the gap between these cylinders. Similarly, in the imaging device disclosed in JP2008-211780A, when changing the mounting position of the lens holding unit, there is a possibility that foreign matter such as liquid or dust may infiltrate from the gap between the intermediate member and the lens holding unit.

The present invention has an object to provide an imaging device in which focus movement due to a temperature variation is suppressed and the infiltration of foreign matter such as liquid or dust is prevented.

An imaging device according to the present invention is provided with an imaging lens, an imaging element, and an intermediate member. The imaging lens is held by a lens barrel and forms an image of a photographic subject. The imaging element captures the image of the photographic subject which is formed by the imaging lens. The intermediate member is made of a material having a linear expansion coefficient different from that of the lens barrel, and has, on the inner peripheral surface of one end thereof, a flange portion which comes into contact with the lens barrel, and holds the lens barrel by joining the surface on the photographic subject side of the lens barrel and the surface on the imaging element side of the flange portion of the intermediate member to each other.

It is preferable that an abutting surface between the surface on the photographic subject side of the lens barrel and the flange portion of the intermediate member is present between the surface on the side nearest the photographic subject of the imaging lens and the surface on the side nearest the imaging element of the imaging lens and is provided further toward the photographic subject side than ⅓ of the distance between the surface on the side nearest the photographic subject of the imaging lens and the surface on the side nearest the imaging element of the imaging lens.

It is preferable that the surface on the photographic subject side of the lens barrel and the flange portion of the intermediate member are joined to each other by an adhesive.

It is preferable that an adhesive reservoir is provided adjacent to the abutting surface between the surface on the photographic subject side of the lens barrel and the flange portion of the intermediate member, in at least one of the outer peripheral surface of the lens barrel and the inner peripheral surface of the intermediate member.

It is preferable that the adhesive reservoir is continuously provided in the entire periphery of, for example, the outer peripheral surface of the lens barrel or the inner peripheral surface of the intermediate member. The adhesive reservoir may be provided in a portion and at a plurality of locations of the outer peripheral surface of the lens barrel or the inner peripheral surface of the intermediate member.

It is preferable that the linear expansion coefficient of the lens barrel is greater than or equal to $10 \times 10^{-6}$ $K^{-1}$ and less than or equal to $70 \times 10^{-6}$ $K^{-1}$.

It is preferable that the linear expansion coefficient of the intermediate member is greater than or equal to $00.1 \times 10^{-6}$ $K^{-1}$ (1/K) and less than or equal to $40 \times 10^{-6}$ $K^{-1}$ (1/K).

Further, it is preferable that the surface on the photographic subject side of the lens barrel which is joined to the flange portion of the intermediate member is a front surface of a flange portion which is provided to protrude toward the outside on the outer peripheral surface of the lens barrel.

In the imaging device according to the present invention, the imaging lens is held by a double structure formed by joining the lens barrel and the intermediate member to each other, and the lens barrel and the intermediate member are joined to each other at the flange portion provided on the inner peripheral surface of the intermediate member and the surface on the photographic subject side of the lens barrel. Therefore, it is possible to suppress focus movement due to a temperature variation and prevent the infiltration of foreign matter such as liquid or dust.

DESCRIPTION OF THE PREFERRED EMBODIMENTS

Figure 1:
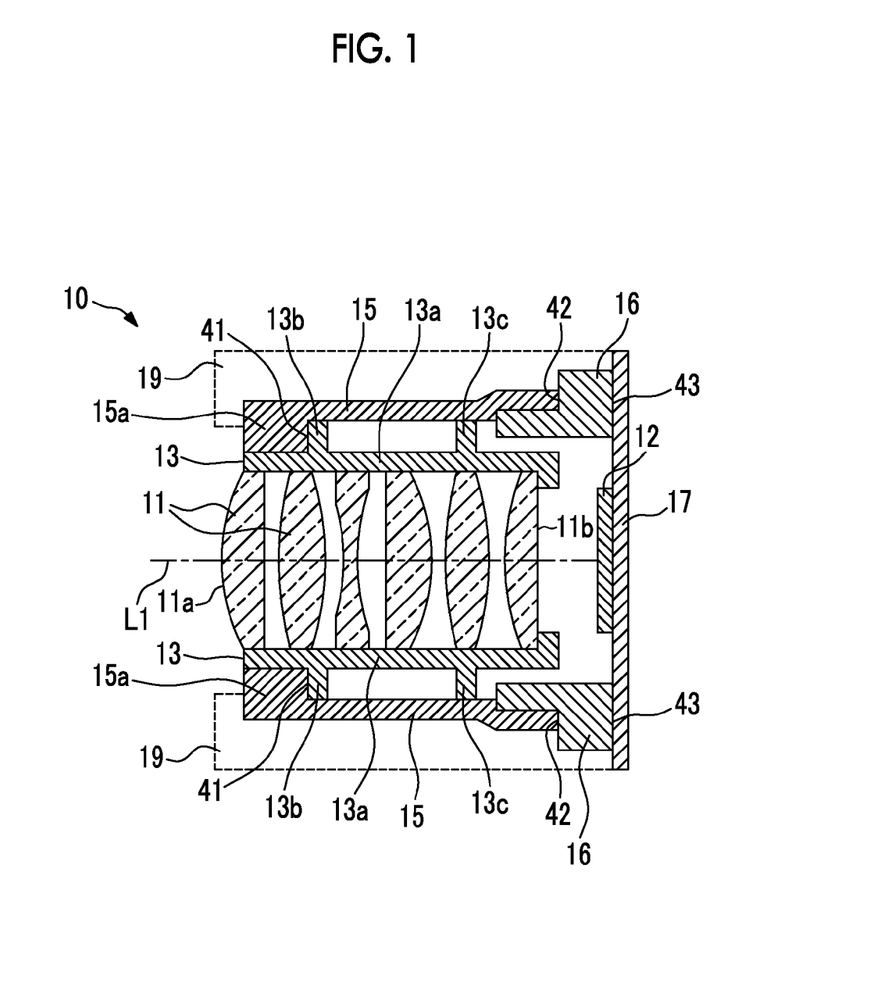
FIG. 1 is a sectional view showing a schematic configuration of an imaging device.
Figure 2:
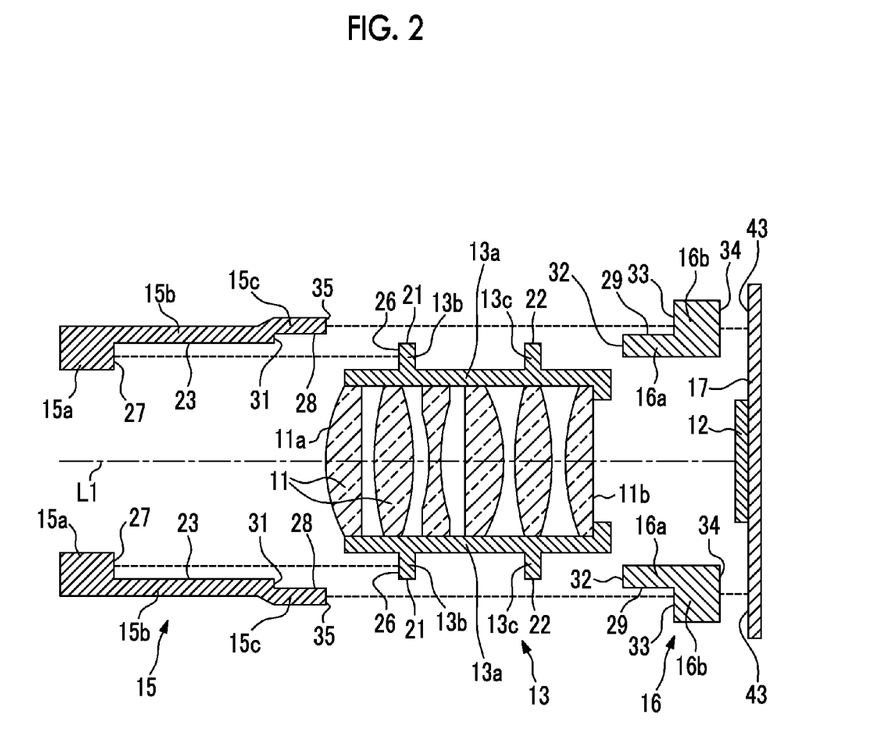
FIG. 2 is a sectional view showing a state where the respective portions of the imaging device are joined to each other.

As shown in FIGS. 1 and 2, an imaging device 10 is provided with an imaging lens 11 and an imaging element 12 and captures an image of a photographic subject which is formed by the imaging lens 11, by the imaging element 12. The imaging device 10 is, for example, a car-mounted camera which is installed in the interior of an automobile.

The imaging lens 11 is a fixed focus lens, is configured with, for example, a lens, a mirror, a prism, or the like, and includes a member which does not substantially have power, such as an optical filter, as necessary. An optical axis L1 of the imaging lens 11 is also the central axes of a lens barrel 13 and an intermediate member 15. In FIG. 1, an imaging lens 11 composed of six lenses is shown as an example. However, the thickness or the surface shape of each lens, the number of lenses, or the presence or absence of other members is selectable. Further, all of the respective lenses configuring the imaging lens 11 are, for example, glass lenses and are held by the lens barrel 13 with a predetermined positional relationship maintained with respect to one another.

The lens barrel 13 has a cylindrical portion 13a and flange portions 13b and 13c and is a substantially cylindrical member as a whole. Further, the lens barrel 13 is joined to the intermediate member 15 and the position thereof with respect to the imaging element 12 is fixed through the intermediate member 15. That is, the imaging lens 11 is directly held by the lens barrel 13. However, as a whole, the position with respect to the imaging element 12 is fixed by a double structure composed of the lens barrel 13 and the intermediate member 15.

The cylindrical portion 13a is a cylinder portion of the lens barrel 13 and holds each lens of the imaging lens 11 through adhesion or the like. For this reason, projections (not shown) or the like for performing the positioning of each lens of the imaging lens 11 are appropriately provided on the inner surface side of the cylindrical portion 13a.

The flange portions 13b and 13c are provided to protrude toward the outside (a direction away from the optical axis L1) on the side surface of the cylindrical portion 13a. Further, the flange portions 13b and 13c are provided on the entire periphery of the cylindrical portion 13a. A flange portion which is located on the photographic subject side (the left side of FIG. 1) is the flange portion 13b, and a flange portion which is located on the imaging element 12 side (the right side of FIG. 1) is the flange portion 13c. Further, the cross sections of the flange portions 13b and 13c along a plane which includes the optical axis L1 have a substantially quadrangular shape. The protrusion amounts of the flange portions 13b and 13c are determined such that side surfaces 21 and 22 (surfaces parallel to the optical axis L1) come into contact with an inner surface 23 of the intermediate member 15.

The flange portion 13b is a joint portion for joining the lens barrel 13 and the intermediate member 15 to each other, and a front surface 26 (the surface on the photographic subject side) of the flange portion 13b is joined to the intermediate member 15. That is, a joint surface 41 between the lens barrel 13 and the intermediate member 15 is the front surface 26 of the flange portion 13b.

Further, the flange portion 13b is provided further toward the front (the photographic subject side) than ⅓ of the center-to-center distance (hereinafter referred to as the length of the imaging lens 11) between a surface 11a on the side nearest the photographic subject and a surface 11b on the side nearest the imaging element 12 of the imaging lens 11. More specifically, the position of the flange portion 13b is determined such that the length from the center of the surface 11a on the side nearest the photographic subject of the imaging lens 11 to the joint surface 41 measured along the optical axis L1 is smaller than ⅓ of the length of the imaging lens 11.

The flange portion 13c is a projection provided in order to prevent shifting of the axis of the lens barrel 13 (the imaging lens 11). That is, in a case where the lens barrel 13 holding the imaging lens 11 is fitted into and joined to the intermediate member 15, the side surface 22 (the surface parallel to the optical axis L1) of the flange portion 13c comes into contact with the inner surface 23 of the intermediate member 15, whereby the central axis of the intermediate member 15 and the optical axis L1 are maintained parallel to each other.

In addition, the lens barrel 13 is formed of, for example, metal such as aluminum or brass, or resin typified by polycarbonate (PC), polyamide (PA), polyphthalamide (PPA), polyphenylene ether (PPE), polybutylene terephthalate (PBT), or polyphenylene sulfide (PPS). In a case of being formed of metal, it is preferable that the linear expansion coefficient of the lens barrel 13 is greater than or equal to approximately $10 \times 10^{-6}$ $K^{-1}$ and less than or equal to $30 \times 10^{-6}$ $K^{-1}$. In a case of being formed of resin, it is preferable that the linear expansion coefficient of the lens barrel 13 is greater than or equal to approximately $10 \times 10^{-6}$ $K^{-1}$ and less than or equal to $70 \times 10^{-6}$ $K^{-1}$. That is, if the dimensions of the lens barrel 13 or the like are determined with the linear expansion coefficient of the lens barrel 13 set to be greater than or equal to $10 \times 10^{-6}$ $K^{-1}$ and less than or equal to $70 \times 10^{-6}$ $K^{-1}$, it is possible to easily select an appropriate material from metals or resins.

The intermediate member 15 holds the lens barrel 13 at one end and is fixed to a lens holder 16 at the other end, whereby the imaging lens 11 is fixed with respect to the imaging element 12 such that the imaging element 12 is located at the focusing position of the imaging lens 11.

The intermediate member 15 has, at a front end portion (an end portion on the photographic subject side) thereof, a flange portion 15a protruding to the inner peripheral surface side (the optical axis L1 side). A rear surface 27 (the surface on the imaging element 12 side) of the flange portion 15a comes into contact with and is joined to the front surface 26 of the flange portion 13b of the lens barrel 13. The intermediate member 15 holds the lens barrel 13 by the joint surface (an abutting surface) 41 where the rear surface 27 of the flange portion 15a and the front surface 26 of the flange portion 13b are joined to each other. The rear surface 27 of the flange portion 15a and the flange portion 13b are joined to each other by an adhesive. The type of adhesive is optional. However, it is preferable to use an adhesive which does not easily deteriorate due to a temperature variation.

A body portion 15b into which the lens barrel 13 is fitted is provided on the rear side (the imaging element 12 side) of the flange portion 15a. The diameter of the portion which is fitted to the flange portion 13b, of the body portion 15b, is determined so as to substantially coincide with the diameter of the lens barrel 13 which includes the protrusion amount of the flange portion 13b, and the inner surface 23 and the side surface 21 of the flange portion 13b come into contact with each other. However, in a case where the inner surface 23 of the body portion 15b and the side surface 21 of the flange portion 13b are not joined to each other, when the intermediate member 15 or the lens barrel 13 expands (or contracts), the flange portion 13b slides with respect to the body portion 15b while coming into contact with the inner surface 23 without being deformed. In addition, in a case where the flange portion 13b is thin compared to the length from the front surface 26 of the flange portion 13b to the lens surface 11b and the influence of expansion or contraction is small, the inner surface 23 and the side surface 21 may be joined to each other.

A fitting portion 15c which is fitted to the lens holder 16 is provided at a rear end portion (an end portion on the imaging element 12 side) of the intermediate member 15. Further, the lens holder 16 is configured with a convex portion 16a which is fitted to the fitting portion 15c of the intermediate member 15, and a base portion 16b against which the intermediate member 15 butts.

In a case where the fitting portion 15c is fitted to the lens holder 16, an inner surface 28 parallel to the optical axis L1, of the fitting portion 15c, comes into contact with a side surface 29 of the lens holder 16, and an inner surface 31 perpendicular to the optical axis L1, of the fitting portion 15c, comes into contact with a front surface 32 of the lens holder 16. However, all of these surfaces are not joined to each other, and therefore, in a case where the intermediate member 15 or the lens barrel 13 expands (or contracts), abutting positions relatively slide. In addition, in a case where the length of the side surface 29 is short compared to the inner surface 23 of the intermediate member 15 and the influence of expansion or contraction is small, the inner surface 28 and the side surface 29 may be joined to each other. The same applies to the inner surface 31 and the front surface 32.

An end face 35 of the fitting portion 15c is joined to a front surface 33 of the base portion 16b by an adhesive in a state of coming into contact with the front surface 33. That is, the intermediate member 15 is fixed to the lens holder 16 by a joint surface 42 where the end face 35 of the fitting portion 15c of the intermediate member 15 is joined to the front surface 33 of the base portion 16b.

A rear surface 34 of the base portion 16b is joined to a joint surface 43 of a driving substrate 17 by, for example, an adhesive. The driving substrate 17 is a substrate on which a circuit or the like for driving the imaging element 12 is mounted, and the imaging element 12 is disposed at an approximately central position therein, for example. The joining position 43 of the lens holder 16 to the driving substrate 17 is determined in advance such that the imaging element 12 is disposed at the center of the lens holder 16. Therefore, the intermediate member 15 holding the lens barrel 13 is fitted and joined to the lens holder 16, whereby the optical axis L1 coincides with the center of the imaging element 12.

In addition, the intermediate member 15 is formed of resin typified by, for example, PC, PBT, PPS, liquid crystal polymer (LCP), or the like, and it is preferable that the linear expansion coefficient thereof is greater than or equal to approximately $0.1 \times 10^{-6}$ K$^{-1}$ and less than or equal to $40 \times 10^{-6}$ K$^{-1}$. A material of the intermediate member 15 is selected such that the linear expansion coefficient thereof is different from those of at least the lens barrel 13 and the lens holder 16. That is, if the dimensions or the like of the intermediate member 15 or the like are determined with the linear expansion coefficient of the intermediate member 15 set to be greater than or equal to $0.1 \times 10^{-6}$ K$^{-1}$ and less than or equal to $40 \times 10^{-6}$ K$^{-1}$, it is possible to easily select an appropriate resin material from the above-described resin materials.

Further, the lens holder 16 is formed of, for example, metal such as aluminum or brass, or resin typified by PC, PA, PPA, PPE, PBT, or PPS. Therefore, in a case of being formed of metal, it is preferable that the linear expansion coefficient of the lens holder 16 is greater than or equal to approximately $10 \times 10^{-6}$ K$^{-1}$ and less than or equal to $30 \times 10^{-6}$ K$^{-1}$. In a case of being formed of resin, it is preferable that the linear expansion coefficient of the lens holder 16 is greater than or equal to approximately $10 \times 10^{-6}$ K$^{-1}$ and less than or equal to $70 \times 10^{-6}$ K$^{-1}$. That is, if the dimensions of the lens holder 16 or the like are determined with the linear expansion coefficient of the lens holder 16 set to be greater than or equal to $10 \times 10^{-6}$ K$^{-1}$ and less than or equal to $70 \times 10^{-6}$ K$^{-1}$, it is possible to easily select an appropriate material from the above-described metal or resin. A material for forming the lens holder 16 may be the same as that of the lens barrel 13.

In addition, the imaging device 10 is covered with a cover member 19 in a state where the lens barrel 13 is mounted on the lens holder 16 with the intermediate member 15 therebetween, and installed at a predetermined location (the interior of an automobile) or the like. The cover member 19 exposes at least the imaging lens 11.

Figure 3A:
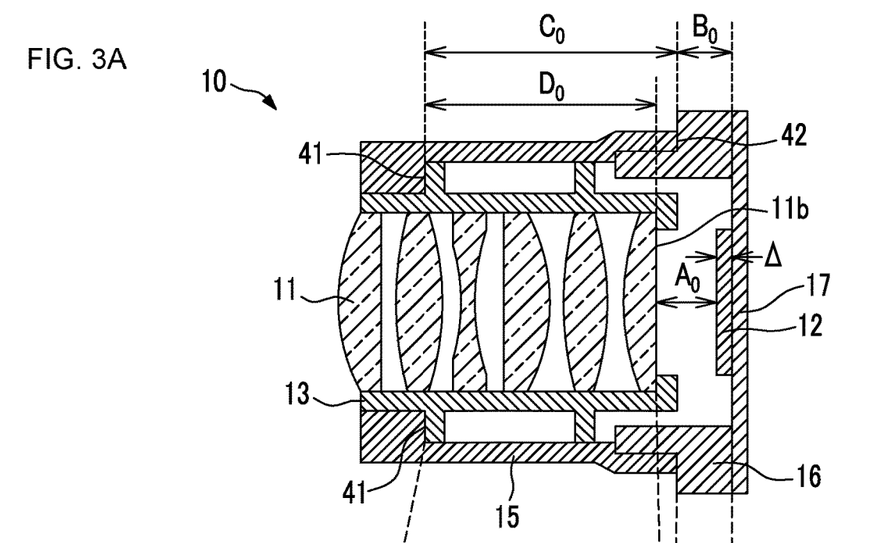
FIGS. 3A and 3B are explanatory diagrams showing the thermal expansion of each portion of the imaging device.

Hereinafter, an operation of the imaging device 10 will be described assuming that the intermediate member 15 and the lens holder 16 are bonded to each other only at the joint surface 42. First, as shown in FIG. 3A, it is assumed that assembling is performed such that in a normal-temperature environment having an atmospheric temperature of, for example, 20° C., a back focus coincides with an imaging surface of the imaging element 12 from the rear-most surface 11b of the imaging lens 11 and the focal position of an image of a photographic subject fits. In this case, when the back focus of the imaging lens 11 is set to be $A_0$ (mm), the length of the base portion 16b of the lens holder 16 is set to be $B_0$ (mm), the length from the joint surface 41 between the lens barrel 13 and the intermediate member 15 to the joint surface 42 between the lens holder 16 and the intermediate member 15 is set to be $C_0$ (mm), the length from the joint surface 41 to a position where the rear-most surface 11b of the imaging lens 11 intersects the optical axis is set to be $D_0$ (mm), and the distance from the driving substrate 17 to the imaging surface of the imaging element 12 is set to be $\Delta$ (mm), a relationship of $\Delta = B_0 + C_0 - D_0 - A_0$ is established.

Figure 3B:
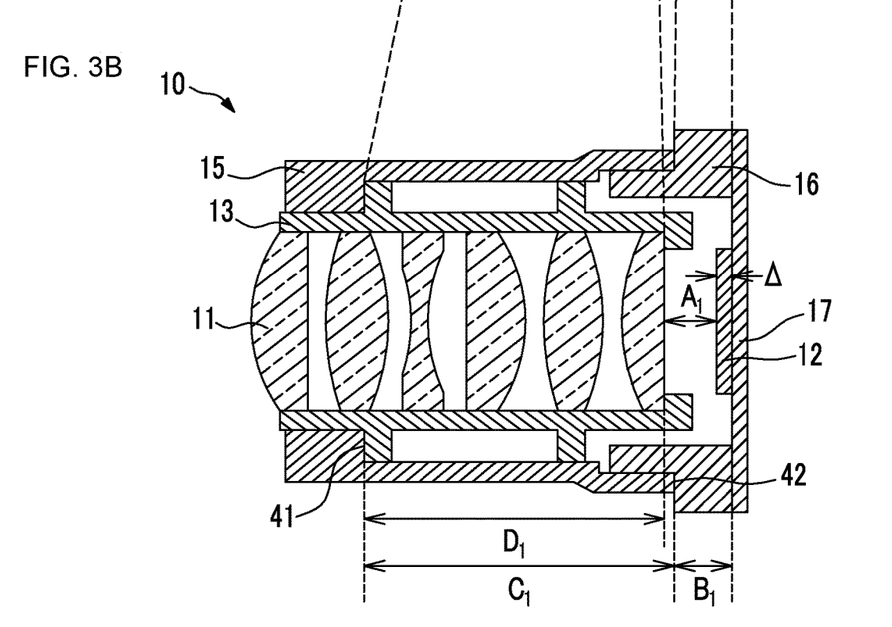

As shown in FIG. 3B, in a high-temperature environment in which a temperature around the imaging device 10 is, for example, 80° C., each portion of the imaging device 10 expands, and thus the length of the base portion 16b of the lens holder 16 expands to $B_1$ ($>B_0$), the length from the joint surface 41 to the joint surface 42 expands to $C_1$ ($>C_0$), and the length from the joint surface 41 to the rear-most surface 11b of the imaging lens 11 expands to $D_1$ ($>D_0$). In a case where the imaging lens 11 is configured with glass lenses, even if the expansion of each lens configuring the imaging lens 11 is ignored, the lens barrel 13 which directly holds the imaging lens 11 expands, whereby the distance between the respective lenses becomes longer, and therefore, the back focus is shortened to, for example, $A_1$ (mm) ($A_1 < A_0$).

Among changes of the respective lengths, all of the expansion of the base portion 16b of the lens holder 16, the expansion of the intermediate member 15 from the joint surface 41 to the joint surface 42, and the shortening of the back focus due to the expansion of the lens barrel 13 exhibit an action of shifting the focal position to the photographic subject side (to make the focal position a so-called front focus) according to a temperature rise. The expansion of the lens barrel 13 is expansion extending to the imaging element 12 side on the basis of the joint surface 41 of the intermediate member 15, and therefore, the expansion of the lens barrel 13 exhibits an action of canceling out the expansion of the lens holder 16 and the intermediate member 15 and of shortening the back focus. Therefore, in the imaging device 10, the distance between the imaging lens 11 and the imaging element 12 is fixed by a double structure composed of the lens barrel 13 and the intermediate member 15, whereby it is possible to reduce at least focus movement due to a temperature variation by appropriately selecting the material (the linear expansion coefficient) of each of the lens barrel 13, the intermediate member 15, and the lens holder 16 and the lengths between the joint surfaces 41, 42, and 43. In particular, if the material (the linear expansion coefficient) of each of the lens barrel 13, the intermediate member 15, and the lens holder 16 and the lengths between the joint surfaces 41, 42, and 43 are appropriately selected so as to satisfy a relationship of $\Delta = B_0 + C_0 - D_0 - A_0 = B_1 + C_1 - D_1 - A_1$, it is possible to prevent the focus movement due to a temperature variation.

In addition, depending on the configuration of the imaging lens 11 (in particular, the length of the imaging lens 11), in a structure made such that the imaging lens 11 is simply held by a double structure composed of the lens barrel 13 and the intermediate member 15, there is no material having an appropriate linear expansion coefficient and there is a case where it is not possible to sufficiently reduce the focus movement due to a temperature variation. Even in such a case, if the flange portion 13b is provided such that the joint surface 41 is located further toward the front (the photographic subject side) than ⅓ of the length of the imaging lens 11, it is possible to select the materials of the lens barrel 13, the intermediate member 15, and the lend holder 16 from the respective materials described above, with there being little dependence on the length or the like of the imaging lens 11, and the effect of reducing the focus movement due to a temperature variation is easily obtained.

In a case of reducing only the focus movement, a configuration may be made in which the joint surface 41 is provided to protrude further toward the front than the surface 11a on the side nearest the photographic subject of the imaging lens 11 and the lens barrel 13 and the intermediate member 15 are joined to each other further toward the front than the imaging lens.

The imaging device 10 has a structure in which it is difficult for foreign matter such as liquid or dust to infiltrate into the inside thereof, as shown below, in addition to being capable of reducing the focus movement due to a temperature variation, as described above.

Figure 4:
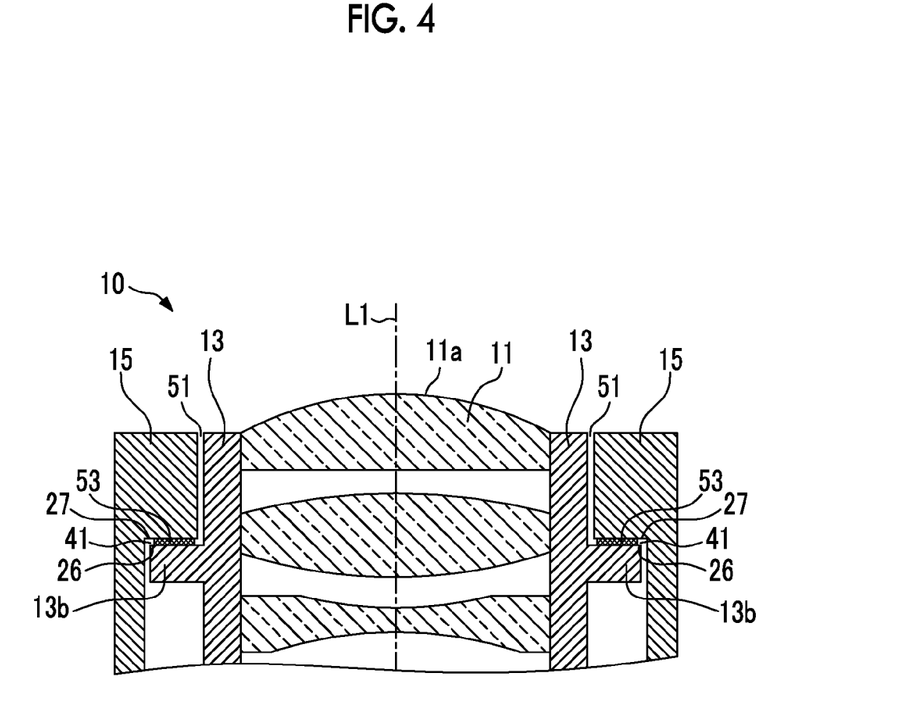
FIG. 4 is a sectional view showing a joint portion between a lens barrel and an intermediate member in an enlarged manner.

As shown in FIG. 4, in the imaging device 10, the side surface of the cylindrical portion 13a of the lens barrel 13 and the side surface of the flange portion 15a of the intermediate member 15 are substantially in contact with each other. However, an actual gap 51 to the extent that the lens barrel 13 is fitted into the intermediate member 15 is present between these side surfaces. Further, these side surfaces are not bonded to each other such that expansion due to a temperature variation is possible. For this reason, in a case where foreign matter such as liquid or dust sticks to the imaging device 10, there is a possibility that the foreign matter such as liquid or dust may infiltrate into the inside (a space between the lens barrel 13 and the intermediate member 15) of the imaging device 10 from the gap 51. In particular, if the lens barrel 13 or the intermediate member 15 repeatedly expands or contracts according to a temperature variation, the foreign matter such as liquid or dust stuck to the front surface of the imaging device 10 is sometimes drawn into the gap 51. However, in the case of the imaging device 10, the flange portion 13b is made in a shape protruding so as to block the gap 51, and therefore, the flange portion 13b acts as a dike (a waterproof dike or a dust-proof dike) against the foreign matter such as liquid or dust having infiltrated into the gap 51. For this reason, in the imaging device 10, even if foreign matter such as liquid or dust infiltrates into the gap 51, it is possible to prevent the foreign matter such as liquid or dust from infiltrating further inside (in particular, into a space in which the imaging element 12 is present). In addition, even in a case where the gap 51 is joined up, it is possible to prevent foreign matter such as liquid or dust from infiltrating from cracks or a clearance occurring in a bonded portion due to a temporal change or the like such as a temperature variation.

Further, the lens barrel 13 and the intermediate member 15 repeatedly expand and contract due to a temperature variation, whereby there is a case where temporal deterioration such as occurrence of cracks or a clearance in an adhesive 53 which is present on the joint surface 41 occurs. However, in the case of the imaging device 10, the joint surface 41 is present on the front surface 26 of the flange portion 13b acting as a dike, whereby a structure is provided in which it is difficult for the foreign matter such as liquid or dust to infiltrate from a temporal deterioration portion of the adhesive 53.

Figure 5:
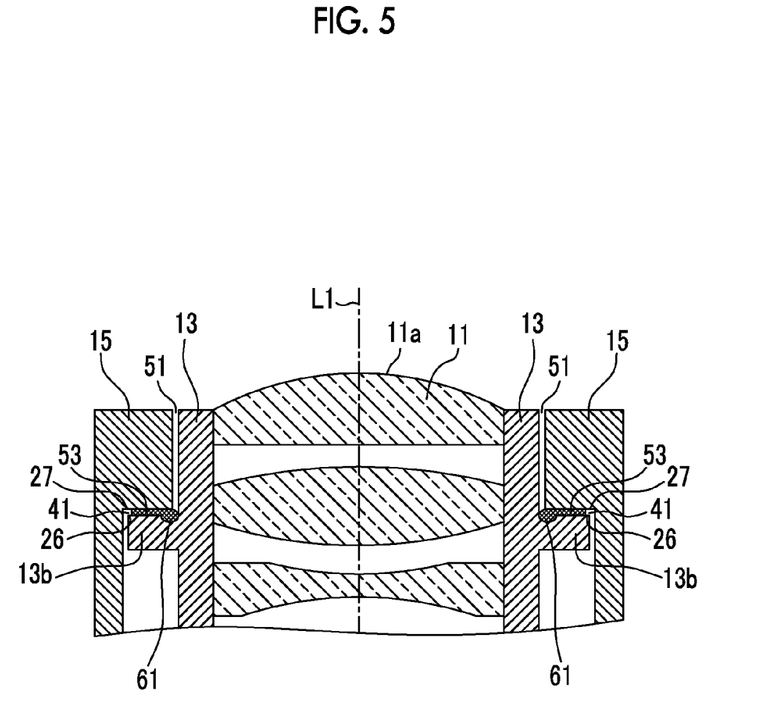
FIG. 5 is a sectional view in a case where an adhesive reservoir is provided in a flange portion.

Further, as shown in FIG. 5, it is preferable to provide an adhesive reservoir 61 in a base end portion of the front surface 26 of the flange portion 13b. In this manner, if the adhesive reservoir 61 is provided, the protrusion of the adhesive 53 from the joint surface 41 can be prevented. In a case where the adhesive 53 protrudes from the joint surface 41 to a portion other than the joint surface 41, the lens barrel 13 and the intermediate member 15 repeatedly expand and contract due to a temperature variation, whereby a protruding portion of the adhesive 53 becomes damaged, and thus there is a case where dust is generated in the inside of the imaging device 10. However, if the protrusion of the adhesive 53 from the joint surface 41 is prevented by providing the adhesive reservoir 61, as described above, it is possible to avoid such a problem.

Figure 6:
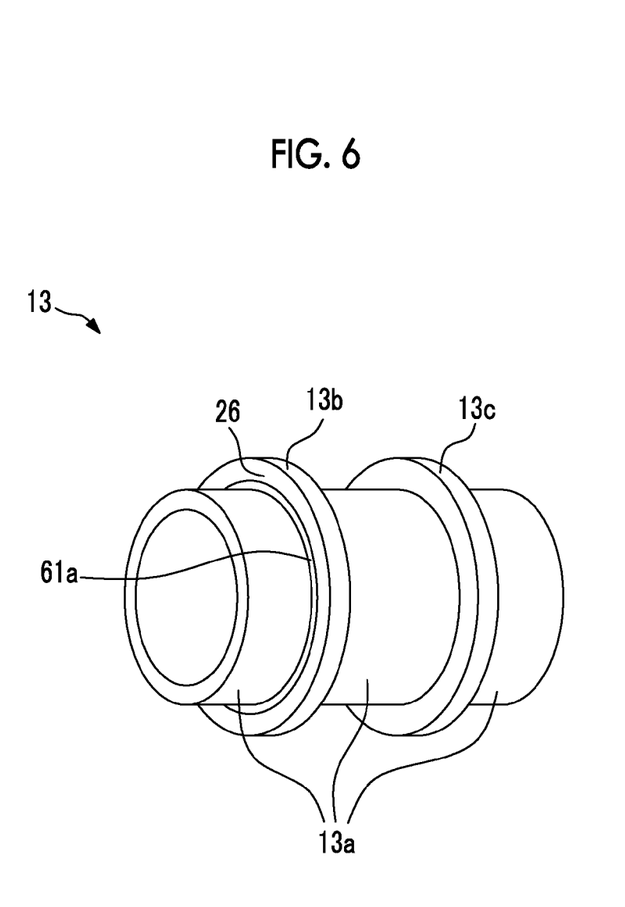
FIG. 6 is a perspective view of a lens barrel in which an adhesive reservoir is provided in the entire periphery of a flange portion.
Figure 7:
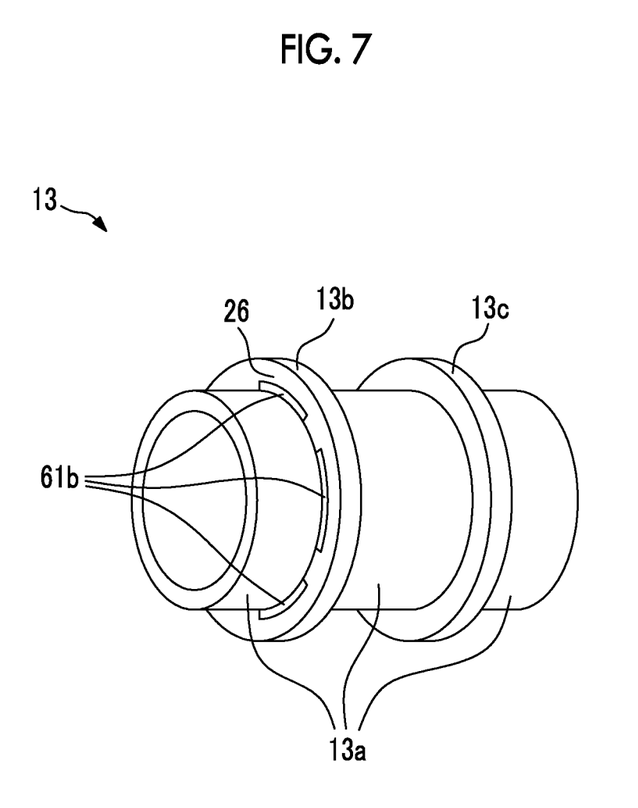
FIG. 7 is a perspective view of a lens barrel in which an adhesive reservoir is provided in a portion of the flange portion.

The adhesive reservoir 61 may be continuously provided in the entire periphery of the flange portion 13b, like an adhesive reservoir 61a shown in FIG. 6, and may be provided to be divided at a plurality of locations, like an adhesive reservoir 61b shown in FIG. 7.

Figure 8:
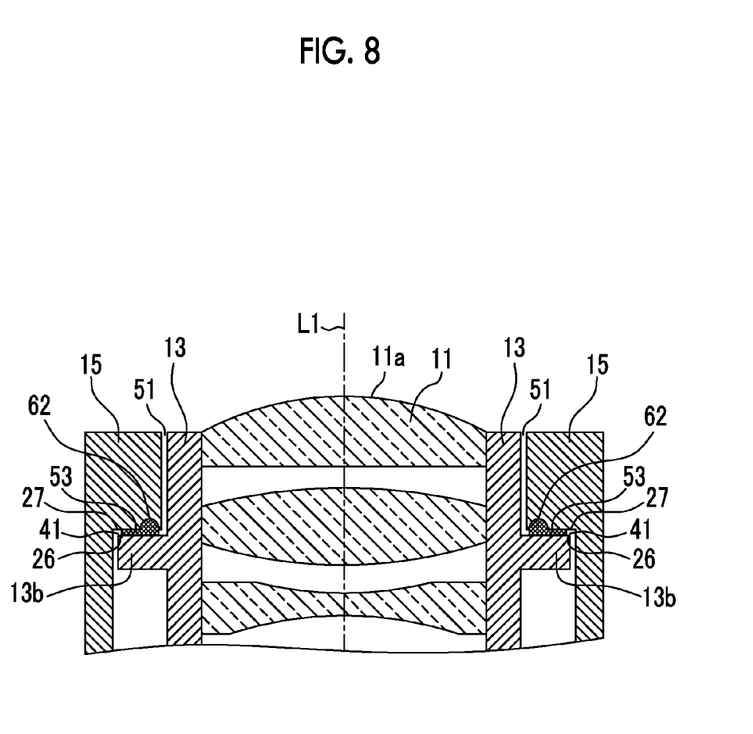
FIG. 8 is a sectional view in a case where an adhesive reservoir is provided in the intermediate member.

Further, as shown in FIG. 8, instead of the adhesive reservoir 61 of the flange portion 13b, an adhesive reservoir 62 may be provided in the intermediate member 15. Similarly to the adhesive reservoir 61a or the adhesive reservoir 61b of the flange portion 13b, the adhesive reservoir 62 may be provided over the entire periphery of the flange portion 15a of the intermediate member 15 or may be provided to be divided at a plurality of locations.

In addition, a configuration may be made in which the adhesive reservoir 61a or the adhesive reservoir 61b is provided in the flange portion 13b and in addition, the adhesive reservoir 62 is provided in the intermediate member 15. Further, instead of the adhesive reservoirs 61a and 61b of the flange portion 13b or the adhesive reservoir 62 of the intermediate member 15, or along with these, an adhesive reservoir may be provided on the side surface of the cylindrical portion 13a of the lens barrel 13.

Further, the adhesive reservoirs 61a and 61b of the flange portion 13b are provided in the base end portion of the flange portion 13b. However, as long as the adhesive 53 does not protrude from the joint surface 41, the positions of the adhesive reservoirs 61a and 61b are selectable. For example, the adhesive reservoirs 61a and 61b may be provided at a location closer to the tip than the base end portion of the flange portion 13b, such as the center of the flange portion 13b, for example. The same applies to a case of providing the adhesive reservoir 62 of the intermediate member 15.

In addition, in FIGS. 5 to 8, the cross-sectional shape (the cross section along a plane which includes the optical axis L1) of each of the adhesive reservoirs 61 (61a and 61b) and 62 is a semicircular shape. However, as long as it is possible to store excess adhesive 53 so as not to protrude from the joint surface 41, the cross-sectional shape of each of the adhesive reservoirs 61 (61a and 61b) and 62 is selectable.

Figure 9:
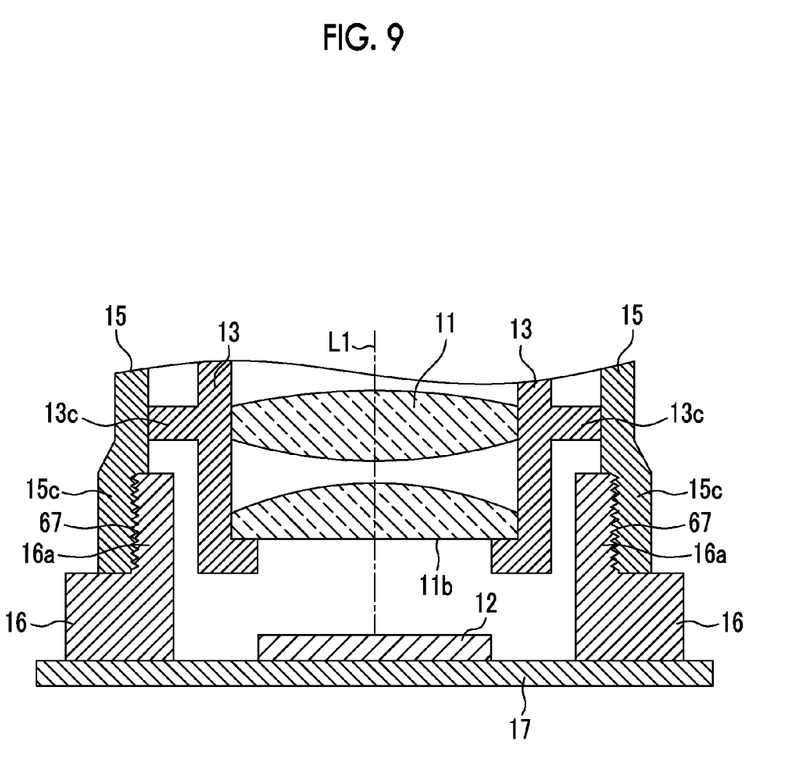
FIG. 9 is a sectional view in a case where the intermediate member and a lens holder are screwed to each other.

In addition, in the imaging device 10, the intermediate member 15 and the lens holder 16 are bonded to each other at the end face 35 of the fitting portion 15c and the front surface 33 of the base portion 16b. However, instead of bonding these to each other, as shown in FIG. 9, a configuration may be made in which screw grooves 67 are formed in the side surface 29 of the convex portion 16a of the lens holder 16 and the inner surface 28 of the fitting portion 15c of the intermediate member 15, which are in contact with each other in the imaging device 10, and the intermediate member 15 and the lens holder 16 are screwed to each other.

In addition, in the imaging device 10, all of the respective lenses configuring the imaging lens 11 are glass lenses. However, instead of a glass lens, a plastic lens may be used. Further, a glass lens and a plastic lens may be used in combination. However, a plastic lens has a larger thermal expansion coefficient than a glass lens, and therefore, in order to suppress focus movement due to a temperature variation, it is preferable to use glass lenses as much as possible.

The imaging device 10 is suitable for a travel recorder for travel recording of a moving body such as an automobile, for example, or a car-mounted camera which performs photographing for assisting in driving or steering such as in parking in a garage. However, in addition to being mounted on a vehicle, the imaging device 10 is suitable for use in a place where a temperature variation is large and there is a possibility that foreign matter such as liquid or dust may stick thereto.

In addition, in the imaging device 10, the side surface 21 of the flange portion 13b is a plane and the cross section of the flange portion 13b along a plane which includes the optical axis L1 has a quadrangular shape. However, the flange portion 13b may have any cross-sectional shape as long as it protrudes on the side surface of the cylindrical portion 13a of the lens barrel 13 and joining to the intermediate member 15 is possible. For example, the contact area between the side surface of the flange portion 13b and the inner surface 23 of the body portion 15b of the intermediate member 15 may be reduced by making the side surface 21 of the flange portion 13b have an arc shape. In this manner, if the contact area between the side surface of the flange portion 13b and the intermediate member 15 is reduced, in a case where the lens barrel 13 or the intermediate member 15 expands (or contracts) due to a temperature variation, friction between the flange portion 13b and the intermediate member 15 is small, and therefore, even in a case where the flange portion 13b is thin, it is possible to prevent the deformation of the flange portion 13b. Further, the lens barrel 13 evenly expands (or contracts) along the optical axis L1 without being caught in the intermediate member 15 at the side surface of the flange portion 13b, and therefore, shifting of the optical axis L1 also does not easily occur. The same applies to the flange portion 13c.

In addition, the cross-sectional shape of the flange portion 13b along a plane which includes the optical axis L1 may be any shape as long as it is possible to join the flange portion 13b to the flange portion 15a of the intermediate member 15. For example, the cross-sectional shape of the flange portion 13b may be a parallelogram or may be a trapezoid. Further, a corner portion (a corner which is formed between the front surface 26 and the side surface 21) may have a rounded shape or may be chamfered.

In addition, in the imaging device 10, in addition to the flange portion 13b for being joined to the intermediate member 15, the flange portion 13c for preventing axis shift is provided. However, the flange portion 13c for preventing axis shift may not be provided.

EXPLANATION OF REFERENCES

10: imaging device
11: imaging lens
12: imaging element
13: lens barrel
13a: cylindrical portion
13b, 13c: flange portion
15: intermediate member
16: lens holder
17: driving substrate
41, 42, 43: joint surface

What is claimed is:
1. An imaging device comprising:
an imaging lens which is held by a lens barrel and forms an image of a photographic subject;
an imaging element which captures the image of the photographic subject which is formed by the imaging lens; and
an intermediate member which is made of a material having a linear expansion coefficient different from that of the lens barrel, and has, on an inner peripheral surface of one end thereof, a flange portion which comes into contact with the lens barrel, and the flange portion holds the lens barrel by joining a surface on the photographic subject side of the lens barrel and a surface on the imaging element side of the flange portion to each other,
wherein the flange portion is made integrally with the intermediate member and is made of a material as same as the intermediate member.

2. The imaging device according to claim 1, wherein an abutting surface between the surface on the photographic subject side of the lens barrel and the flange portion is present between a surface on the side nearest the photographic subject of the imaging lens and a surface on the side nearest the imaging element of the imaging lens and is provided further toward the photographic subject side than ⅓ of a distance between the surface on the side nearest the photographic subject of the imaging lens and the surface on the side nearest the imaging element of the imaging lens.

3. The imaging device according to claim 1, wherein the surface on the photographic subject side of the lens barrel and the flange portion of the intermediate member are joined to each other by an adhesive.

4. The imaging device according to claim 2, wherein the surface on the photographic subject side of the lens barrel and the flange portion of the intermediate member are joined to each other by an adhesive.

5. The imaging device according to claim 3, wherein an adhesive reservoir is provided adjacent to an abutting surface between the surface on the photographic subject side of the lens barrel and the flange portion, in at least one of an outer peripheral surface of the lens barrel and an inner peripheral surface of the intermediate member.

6. The imaging device according to claim 4, wherein an adhesive reservoir is provided adjacent to an abutting surface between the surface on the photographic subject side of the lens barrel and the flange portion, in at least one of an outer peripheral surface of the lens barrel and an inner peripheral surface of the intermediate member.

7. The imaging device according to claim 5, wherein the adhesive reservoir is continuously provided in the entire periphery of the outer peripheral surface of the lens barrel or the inner peripheral surface of the intermediate member.

8. The imaging device according to claim 6, wherein the adhesive reservoir is continuously provided in the entire periphery of the outer peripheral surface of the lens barrel or the inner peripheral surface of the intermediate member.

9. The imaging device according to claim 5, wherein the adhesive reservoir is provided in a portion and at a plurality of locations of the outer peripheral surface of the lens barrel or the inner peripheral surface of the intermediate member.

10. The imaging device according to claim 6, wherein the adhesive reservoir is provided in a portion and at a plurality of locations of the outer peripheral surface of the lens barrel or the inner peripheral surface of the intermediate member.

11. The imaging device according to claim 1, wherein the linear expansion coefficient of the lens barrel is greater than or equal to $10 \times 10^{-6}$ $K^{-1}$ and less than or equal to $70 \times 10^{-6}$ $K^{-1}$.

12. The imaging device according to claim 2, wherein the linear expansion coefficient of the lens barrel is greater than or equal to $10 \times 10^{-6}$ $K^{-1}$ and less than or equal to $70 \times 10^{-6} K^{-1}$.

13. The imaging device according to claim 3, wherein the linear expansion coefficient of the lens barrel is greater than or equal to $10 \times 10^{-6}$ $K^{-1}$ and less than or equal to $70 \times 10^{-6} K^{-1}$.

14. The imaging device according to claim 1, wherein the linear expansion coefficient of the intermediate member is greater than or equal to $0.1 \times 10^{-6}$ $K^{-1}$ and less than or equal to $40 \times 10^{-6}$ $K^{-1}$.

15. The imaging device according to claim 2, wherein the linear expansion coefficient of the intermediate member is greater than or equal to $0.1 \times 10^{-6}$ $K^{-1}$ and less than or equal to $40 \times 10^{-6}$ $K^{-1}$.

16. The imaging device according to claim 3, wherein the linear expansion coefficient of the intermediate member is greater than or equal to $0.1 \times 10^{-6}$ $K^{-1}$ and less than or equal to $40 \times 10^{-6}$ $K^{-1}$.

17. The imaging device according to claim 1, wherein the surface on the photographic subject side of the lens barrel which is joined to the flange portion of the intermediate member is a front surface of a flange portion which is provided to protrude toward the outside on an outer peripheral surface of the lens barrel.

18. The imaging device according to claim 2, wherein the surface on the photographic subject side of the lens barrel which is joined to the flange portion of the intermediate member is a front surface of a flange portion which is provided to protrude toward the outside on an outer peripheral surface of the lens barrel.

* * * * *